US010390263B2

(12) United States Patent
Chen et al.

(10) Patent No.: US 10,390,263 B2
(45) Date of Patent: Aug. 20, 2019

(54) INFORMATION TRANSMISSION METHOD, INFORMATION MODIFICATION METHOD, AND APPARATUSES

(71) Applicant: Huawei Technologies Co., Ltd., Shenzhen, Guangdong (CN)

(72) Inventors: Xiayun Chen, Shanghai (CN); Guoyu Ni, Shanghai (CN); Xuejing Wan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 143 days.

(21) Appl. No.: 14/959,857

(22) Filed: Dec. 4, 2015

(65) Prior Publication Data
US 2016/0088526 A1    Mar. 24, 2016

Related U.S. Application Data

(63) Continuation of application No. PCT/CN2013/076809, filed on Jun. 5, 2013.

(51) Int. Cl.
*H04W 36/00* (2009.01)
*H04W 8/22* (2009.01)
*H04W 8/18* (2009.01)

(52) U.S. Cl.
CPC ......... *H04W 36/0022* (2013.01); *H04W 8/18* (2013.01); *H04W 8/22* (2013.01)

(58) Field of Classification Search
CPC ...... H04W 36/0022; H04W 8/22; H04W 8/18
See application file for complete search history.

(56) References Cited

U.S. PATENT DOCUMENTS

2009/0264131 A1    10/2009  Wu et al.
2011/0051691 A1*    3/2011  Hietalahti ............... H04W 8/22
                                                      370/331
(Continued)

FOREIGN PATENT DOCUMENTS

CN          101730058 A        6/2010
CN          102783215 A       11/2012
(Continued)

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 12)", 3GPP TS 23.401 V12.0.0, Mar. 2013, 296 pages.
(Continued)

*Primary Examiner* — Asad M Nawaz
*Assistant Examiner* — Syed Ali

(57) ABSTRACT

The present invention relates to the field of mobile communications technologies, and in particular, to an information transmission method, an information modification method, and apparatuses, so as to solve a technical problem of voice transmission interruption in an SRVCC scenario in the prior art. In embodiments of the present invention, when a UE is in a connected state, a base station is notified of an SRVCC capability of the UE in real time, so that the base station can update the locally stored SRVCC capability of the UE in real time, and then determine, according to an actual situation, whether to initiate an SRVCC process, thereby ensuring a success rate of the SRVCC process and avoiding a possible phenomenon of call drop as far as possible.

14 Claims, 7 Drawing Sheets

601
Obtain first information when a terminal UE is in a connected state, where the first information carries first state information, and the first state information is used to represent that an SRVCC capability of the UE is a second capability 602
Update local SRVCC capability information of the UE according to the first state information

(56) References Cited

U.S. PATENT DOCUMENTS

| | | | |
|---|---|---|---|
| 2012/0224564 A1* | 9/2012 | Paisal | H04N 7/148 370/331 |
| 2013/0016699 A1 | 1/2013 | Nakamura et al. | |
| 2013/0094472 A1 | 4/2013 | Klingenbrunn et al. | |
| 2013/0100929 A1* | 4/2013 | Liu | H04W 36/00 370/331 |
| 2013/0142168 A1* | 6/2013 | Vedrine | H04W 36/0022 370/331 |
| 2013/0208659 A1 | 8/2013 | Nishida | |
| 2013/0265954 A1* | 10/2013 | Dahlen | H04W 48/18 370/329 |
| 2013/0301614 A1* | 11/2013 | Lu | H04W 36/0022 370/331 |
| 2013/0329647 A1* | 12/2013 | Keller | H04W 8/04 370/328 |
| 2014/0348129 A1* | 11/2014 | Yang | H04W 36/0016 370/331 |
| 2014/0370842 A1* | 12/2014 | Abtin | H04W 4/90 455/404.2 |
| 2015/0065106 A1* | 3/2015 | Catovic | H04W 8/22 455/418 |
| 2015/0181416 A1* | 6/2015 | Dominguez Romero | H04W 8/22 370/328 |
| 2016/0073450 A1* | 3/2016 | Vikberg | H04W 36/24 370/329 |

FOREIGN PATENT DOCUMENTS

| | | |
|---|---|---|
| CN | 103069880 A | 4/2013 |
| CN | 103249019 A | 8/2013 |
| WO | WO 2010/048834 A1 | 5/2010 |
| WO | WO 2012/097509 A1 | 7/2012 |
| WO | WO 2013/064401 A1 | 5/2013 |

OTHER PUBLICATIONS

Change Request, "Maximum number of active EPS bearer contexts in combined procedure", Renesas Mobile Europe Ltd et al., 3GPP TSG-CT WG1 Meeting #79, Aug. 6-10, 2012, 6 pages, C1-123319, Revision of C1-122793.

"3rd Generation Partnership Project; Technical Specification Group Radio Access Network; Evolved Universal Terrestrial Radio Access Network (E-UTRAN); S1 Application Protocol (S1AP) (Release 11)", 3GPP TS 36.413 V11.3.0, Mar. 2013, 274 pages.

"3rd Generation Partnership Project; Technical Specification Group Services and System Aspects; Single Radio Voice Call Continuity (SRVCC); Stage 2 (Release 11)", 3GPP TS 23.216 V11.8.0, Mar. 2013, 67 pages.

* cited by examiner

INFORMATION TRANSMISSION METHOD, INFORMATION MODIFICATION METHOD, AND APPARATUSES

CROSS-REFERENCE TO RELATED APPLICATIONS

This application is a continuation of International Application No. PCT/CN2013/076809, filed on Jun. 5, 2013, which is hereby incorporated by reference in its entirety.

TECHNICAL FIELD

The present invention relates to the field of mobile communications technologies, and in particular, to an information transmission method, an information modification method, and apparatuses.

BACKGROUND

Because conventional 2G/3G (second generation mobile communication/third generation mobile communication) networks include both CS (Circuit Switched, circuit switched) and PS (Packet Switched, packet switched) networks, the CS network may be used for a voice service, and the PS network may be used for a data service. However, for a 4G (fourth generation mobile communication) network, because a protocol of the 4G network defines the PS network only, a CS device is no longer available in the 4G network. However, the voice service is necessary in real life. Therefore, a 3GPP (the 3rd Generation Partnership Project) protocol specifies two voice solutions, which are CSFB (Circuit Switched Fallback, circuit switched fallback) and VoLTE (Voice Over Long Term Evolution, voice over long term evolution) separately.

The CSFB refers to that: when a user performs combined attachment to the 4G network, and needs to perform a voice telephone service, the user can notify a network side, then a network device actively enables the user to fall back to the 2G/3G network, and after falling back to the 2G/3G network, the user can perform a voice service by using the conventional CS network.

The VoLTE voice solution refers to that: a user directly makes a voice call in an LTE network by using an LTE bearer. However, in this solution, when the user moves from the 4G network to the 2/3G network, it is necessary to solve a problem of how to maintain voice call continuity by using an SRVCC (SingleRadioVoiceCallContinuity, single radio voice call continuity) technology.

The SRVCC technology refers to that: when a user moves to a coverage area of the 2G/3G network in a process of making a call in the 4G network by using the VoLTE, when an eNodeB (a base station) currently serving the user determines that both the current user and a network side support an SRVCC capability, and when a terminal reports that a destination side network is a GU (GSM EDGE Radio Access Network, UMTS Terrestrial Radio Access Network; Global System for Mobile Communications EDGE Radio Access Network, Universal Mobile Telecommunications System Terrestrial Radio Access Network) network, a base station may initiate an SRVCC process, and a handover from PS to CS is implemented with the cooperation between the network side and the terminal; and after moving to the 2/3G network, the user still uses a conventional CS device to make a voice call, and a voice service may not be interrupted.

In a current SRVCC scenario, a phenomenon of voice transmission interruption may occur.

SUMMARY

Embodiments of the present invention provide an information transmission method, an information modification method, and apparatuses to solve a technical problem of voice transmission interruption in an SRVCC scenario.

According to a first aspect of the present invention, an information transmission method is provided, including:

determining, when a terminal UE is in a connected state, whether a single radio voice call continuity SRVCC capability of the UE is changed from a first capability to a second capability that is different from the first capability; and sending first information to a base station to which the UE belongs when the SRVCC capability is changed from the first capability to the second capability, where the first information carries first state information, and the first state information is used to represent that the SRVCC capability of the UE is the second capability, so that the base station can update local SRVCC capability information of the UE according to the first information.

With reference to the first aspect, in a first possible implementation manner, the step of determining whether an SRVCC capability of the UE is changed from a first capability to a second capability that is different from the first capability includes:

determining whether a capability that itself supporting SRVCC is changed from the first capability to the second capability, and determining whether SRVCC subscription data of the UE in a server is changed, where if the capability that itself supporting SRVCC is changed from the first capability to the second capability, and/or the SRVCC subscription data of the UE in the server is changed, determining that the SRVCC capability of the UE is changed from the first capability to the second capability.

With reference to the first aspect or the first possible implementation manner, in a second possible implementation manner, the first information is UE Context Modification Request information, a message specified in 3GPP, and the first state information is SRVCC Operation Possible information.

With reference to the first aspect or the second possible implementation manner, in a third possible implementation manner, before the sending first information to a base station when the SRVCC capability of the UE is changed from the first capability to the second capability, the method further includes the following step: sending second information to the base station, where the second information is used to instruct the base station to switch a state of the UE from the connected state to a non-connected state.

With reference to the third possible implementation manner, in a fourth possible implementation manner, the step of sending second information to the base station includes:

determining whether the UE is currently performing a first process flow; and when the UE is not currently performing the first process flow, sending the second information to the base station.

With reference to the third possible implementation manner or the fourth possible implementation manner, in a fifth possible implementation manner, when or after the sending second information to the base station, the method further includes the following step: maintaining a bearer of the UE.

With reference to any one possible implementation manner of the third possible implementation manner to the fifth possible implementation manner, in a sixth possible implementation manner, after the sending second information to the base station, the method further includes steps of:

obtaining third information sent by the UE, where the third information is used to request recovering the state of the UE to the connected state; and sending first request information to the base station according to the third information, so that the base station switches the state of the UE from the non-connected state to the connected state.

With reference to the first aspect or any one possible implementation manner of the first possible implementation manner to the sixth possible implementation manner, in a seventh possible implementation manner, the first capability is a capability of supporting SRVCC, and the second capability is a capability of not supporting SRVCC; or the first capability is a capability of not supporting SRVCC, and the second capability is a capability of supporting SRVCC.

According to a second aspect of the present invention, an information modification method is provided, including:

obtaining first information when a terminal UE is in a connected state, where the first information carries first state information, and the first state information is used to represent that an SRVCC capability of the UE is a second capability; and updating local SRVCC capability information of the UE according to the first state information.

With reference to the second aspect, in a first possible implementation manner, the first information is UE Context Modification Request information, a message specified in 3GPP, and the first state information is SRVCC Operation Possible information.

With reference to the second aspect or the first possible implementation manner, in a second possible implementation manner, the step of updating local SRVCC capability information of the UE according to the first state information includes:

determining whether the locally stored SRVCC capability information of the UE represents that a current SRVCC capability of the UE is the second capability; and when determining that the locally stored SRVCC capability information of the UE represents that the current SRVCC capability of the UE is a first capability that is different from the second capability, changing the SRVCC capability corresponding to the locally stored SRVCC capability information of the UE to the second capability.

With reference to the second aspect, in a third possible implementation manner, before the obtaining first information when a terminal UE is in a connected state, the method further includes steps of:

obtaining second information that is used to represent switching a state of the UE; and switching the state of the UE from the connected state to a non-connected state according to the second information.

With reference to the third possible implementation manner, in a fourth possible implementation manner, after the switching the state of the UE from the connected state to a non-connected state according to the second information, the method further includes steps of:

obtaining first request information that is used to represent switching the state of the UE; and switching the state of the UE from the non-connected state to the connected state according to the first request information.

With reference to the second aspect, the third possible implementation manner or the fourth possible implementation manner, in a fifth possible implementation manner, the step of updating local SRVCC capability information of the UE according to the first state information includes: storing the first state information as the local SRVCC capability information.

According to a third aspect of the present invention, an information transmission apparatus is provided, including:

a first determining module, configured to determine, when a terminal UE is in a connected state, whether a single radio voice call continuity SRVCC capability of the UE is changed from a first capability to a second capability that is different from the first capability; and a sending module, configured to send first information to a base station to which the UE belongs when the SRVCC capability is changed from the first capability to the second capability, where the first information carries first state information, and the first state information is used to represent that the SRVCC capability of the UE is the second capability, so that the base station can update local SRVCC capability information of the UE according to the first information.

With reference to the third aspect, in a first possible implementation manner, the first determining module is specifically configured to determine whether a capability that itself supporting SRVCC is changed from the first capability to the second capability, and determine whether SRVCC subscription data of the UE in a server is changed, where if the capability that itself supporting SRVCC is changed from the first capability to the second capability, and/or the SRVCC subscription data of the UE in the server is changed, determine that the SRVCC capability of the UE is changed from the first capability to the second capability.

With reference to the third aspect, in a second possible implementation manner, when the SRVCC capability of the UE is changed from the first capability to the second capability, the sending module is further configured to send second information to the base station, where the second information is used to instruct the base station to switch a state of the UE from the connected state to a non-connected state.

With reference to the second possible implementation manner, in a third possible implementation manner, the first determining module is further configured to determine whether the UE is currently performing a first process flow; and the sending module is specifically further configured to: when the UE is not currently performing the first process flow, send the second information to the base station.

With reference to the second possible implementation manner or the third possible implementation manner, in a fourth possible implementation manner, the apparatus further includes a maintaining module that is configured to maintain a bearer of the UE.

With reference to the second possible implementation manner, the third possible implementation manner, or the fourth possible implementation manner, in a fifth possible implementation manner, the apparatus further includes a first acquiring module, where the first acquiring module is configured to obtain third information sent by the UE, where the third information is used to request recovering the state of the UE to the connected state; and the sending module is further configured to send first request information to the base station according to the third information, so that the base station switches the state of the UE from the non-connected state to the connected state.

According to a fourth aspect of the present invention, an information modification apparatus is provided, including:

a second acquiring module, configured to obtain first information when a terminal UE is in a connected state, where the first information carries first state information, and the first state information is used to represent that an SRVCC capability of the UE is a second capability; and an updating module, configured to update local SRVCC capability information of the UE according to the first state information.

With reference to the fourth aspect, in a first possible implementation manner, the apparatus further includes a second determining module, where the second determining module is configured to determine whether the locally stored SRVCC capability information of the UE represents that a current SRVCC capability of the UE is the second capability; and the updating module is specifically configured to: when it is determined that the locally stored SRVCC capability information of the UE represents that the current SRVCC capability of the UE is a first capability that is different from the second capability, change the SRVCC capability corresponding to the locally stored SRVCC capability information of the UE to the second capability.

With reference to the fourth aspect, in a second possible implementation manner, the apparatus further includes a switching module;

the second acquiring module is further configured to obtain second information that is used to represent switching a state of the UE; and the switching module is configured to switch the state of the UE from the connected state to a non-connected state according to the second information.

With reference to the second possible implementation manner, in a third possible implementation manner, the second acquiring module is further configured to obtain first request information that is used to represent switching the state of the UE; and the switching module is further configured to switch the state of the UE from the non-connected state to the connected state according to the first request information.

With reference to the fourth aspect, the second possible implementation manner or the third possible implementation manner, in a fourth possible implementation manner, the updating module is specifically configured to store the first state information as the local SRVCC capability information.

According to a fifth aspect of the present invention, an information transmission apparatus is provided, including:

a first processor and a first interface, where the first interface is configured to interact with an external network element; and the first processor is configured to determine, when a terminal UE is in a connected state, whether a single radio voice call continuity SRVCC capability of the UE is changed from a first capability to a second capability that is different from the first capability; and send first information to a base station to which the UE belongs through the first interface when the SRVCC capability is changed from the first capability to the second capability, where the first information carries first state information, and the first state information is used to represent that the SRVCC capability of the UE is the second capability, so that the base station can update local SRVCC capability information of the UE according to the first information.

With reference to the fifth aspect, in a first possible implementation manner, that the first processor is configured to determine, when a terminal UE is in a connected state, whether a single radio voice call continuity SRVCC capability of the UE is changed from a first capability to a second capability that is different from the first capability specifically includes: determining whether a capability that itself supporting SRVCC is changed from the first capability to the second capability, and determining whether SRVCC subscription data of the UE in a server is changed, where if the capability that itself supporting SRVCC is changed from the first capability to the second capability, and/or the SRVCC subscription data of the UE in the server is changed, determine that the SRVCC capability of the UE is changed from the first capability to the second capability.

With reference to the fifth aspect, in a second possible implementation manner, when the SRVCC capability of the UE is changed from the first capability to the second capability, the first processor is further configured to: send second information to the base station through the first interface, where the second information is used to instruct the base station to switch a state of the UE from the connected state to a non-connected state.

With reference to the second possible implementation manner, in a third possible implementation manner, the first processor is further configured to determine whether the UE is currently performing a first process flow; and when the UE is not currently performing the first process flow, send the second information to the base station through the first interface.

With reference to the second possible implementation manner or the third possible implementation manner, in a fourth possible implementation manner, the first processor is further configured to maintain a bearer of the UE.

With reference to the second possible implementation manner, the third possible implementation manner or the fourth possible implementation manner, in a fifth possible implementation manner, the first processor is further configured to: obtain, through the first interface, third information sent by the UE, where the third information is used to request recovering the state of the UE to the connected state; and send first request information to the base station through the first interface according to the third information, so that the base station switches the state of the UE from the non-connected state to the connected state.

According to a sixth aspect of the present invention, an information modification apparatus is provided, including:

a second processor and a second interface, where the second interface is configured to interact with an external network element; and the second processor is configured to: obtain first information through the second interface when a terminal UE is in a connected state, where the first information carries first state information, and the first state information is used to represent that an SRVCC capability of the UE is a second capability; and update local SRVCC capability information of the UE according to the first state information.

With reference to the sixth aspect, in a first possible implementation manner, that the second processor is configured to update local SRVCC capability information of the UE according to the first state information specifically includes: determining whether the locally stored SRVCC capability information of the UE represents that a current SRVCC capability of the UE is the second capability; and when determining that the locally stored SRVCC capability information of the UE represents that the current SRVCC capability of the UE is a first capability that is different from the second capability, changing the SRVCC capability corresponding to the locally stored SRVCC capability information of the UE to the second capability.

With reference to the sixth aspect, in a second possible implementation manner, the second processor is further configured to obtain, through the second interface, second information that is used to represent switching a state of the UE, and switch the state of the UE from the connected state to a non-connected state according to the second information.

With reference to the second possible implementation manner, in a third possible implementation manner, the second processor is further configured to obtain, through the second interface, first request information that is used to represent switching the state of the UE, and switch the state of the UE from the non-connected state to the connected state according to the first request information.

With reference to the sixth aspect, the second possible implementation manner or the third possible implementation manner, in a fourth possible implementation manner, that the second processor is configured to update local SRVCC capability information of the UE according to the first state information specifically includes: storing the first state information as the local SRVCC capability information.

The information transmission method in the embodiments of the present invention may include: determining, when a terminal UE is in a connected state, whether a single radio voice call continuity SRVCC capability of the UE is changed from a first capability to a second capability that is different from the first capability; and sending first information to a base station to which the UE belongs when the SRVCC capability is changed from the first capability to the second capability, where the first information carries first state information, and the first state information is used to represent that the SRVCC capability of the UE is the second capability, so that the base station can update local SRVCC capability information of the UE according to the first information.

In the embodiments of the present invention, when the UE is in the connected state, if the SRVCC capability of the UE is changed, the first information may be used to notify the base station of the new SRVCC capability of the UE, so that the base station can update the locally stored SRVCC capability information of the UE according to the current SRVCC capability of the UE. In this way, when the UE is in the connected state, the base station may also be notified of a change situation of the SRVCC capability of the UE at any time, so that the base station may determine, according to an actual situation, whether to initiate an SRVCC process, so as to ensure as far as possible that the SRVCC process can be performed successfully, avoid a phenomenon of call drop, and ensure continuity of voice communication.

DETAILED DESCRIPTION

Figure 1:
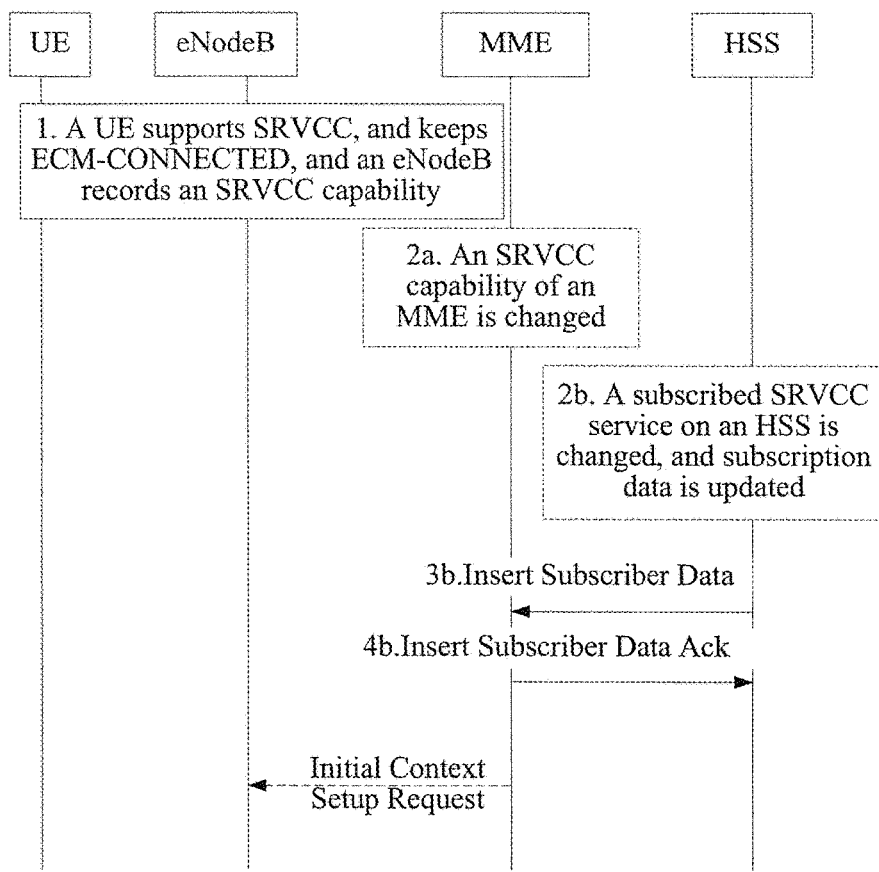
FIG. 1 is an interaction diagram of notifying a base station of an SRVCC capability of a terminal in the prior art.

An information transmission method in the embodiments of the present invention may include: determining, when a terminal UE is in a connected state, whether a single radio voice call continuity SRVCC capability of the UE is changed from a first capability to a second capability that is different from the first capability; and sending first information to a base station to which the UE belongs when the SRVCC capability is changed from the first capability to the second capability, where the first information carries first state information, and the first state information is used to represent that the SRVCC capability of the UE is the second capability, so that the base station can update local SRVCC capability information of the UE according to the first information.

In the embodiments of the present invention, when the UE is in the connected state, if the SRVCC capability of the UE is changed, the first information may be used to notify the base station of the new SRVCC capability of the UE, so that the base station can update the locally stored SRVCC capability information of the UE according to the current SRVCC capability of the UE. In this way, when the UE is in the connected state, the base station may also be notified of a change situation of the SRVCC capability of the UE at any time, so that the base station may determine, according to an actual situation, whether to initiate an SRVCC process, so as to ensure as far as possible that the SRVCC process can be performed successfully, avoid a phenomenon of call drop, and ensure continuity of voice communication.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Technologies described in this specification may be applied to processes of handovers between 4G communications systems and 2G or 3G communications systems, for example, current 2G and 3G communications systems such as a Global System for Mobile Communications (GSM, Global System for Mobile communications), a Code DivisionMultiple Access (CDMA, Code DivisionMultiple Access) system, a Time Division Multiple Access (TDMA, Time Division Multiple Access) system, a Wideband Code Division Multiple Access (WCDMA, Wideband Code Division Multiple Access) system, a Frequency Division Multiple Access (FDMA, Frequency Division Multiple Access) system, an Orthogonal Frequency-Division Multiple Access (OFDMA, Orthogonal Frequency-Division Multiple Access) system, a single-carrier FDMA (SC-FDMA) system, a General Packet Radio Service (GPRS, General Packet Radio Service) system, and current 4G communications systems such as a Long Term Evolution (LTE, Long Term Evolution) system, and other communications systems of these types.

This specification describes various aspects with reference to a UE and/or a base station and/or an MME.

The user equipment may be a wireless terminal or a wired terminal. The wireless terminal may refer to a device that provides a user with voice and/or data connectivity, a handheld device with a wireless connection function, or another processing device connected to a radio modem. The wireless terminal may communicate with one or more core networks through a radio access network (such as RAN, Radio Access Network). The wireless terminal may be a mobile terminal, such as a mobile phone (also referred to as a "cellular" phone) or a computer with a mobile terminal, for example, may be a portable, pocket-sized, handheld, computer built-in, or in-vehicle mobile apparatus, which exchanges voice and/or data with the radio access network. For example, it may be a device such as a personal communications service (PCS, Personal Communication Service) phone, a cordless telephone set, a Session Initiation Protocol (SIP) phone, a wireless local loop (WLL, Wireless Local Loop) station, or a personal digital assistant (PDA, Personal Digital Assistant). The wireless terminal may also be referred to as a system, a subscriber unit (Subscriber Unit), a subscriber station (Subscriber Station), a mobile station (Mobile Station), a mobile terminal (Mobile), a remote station (Remote Station), an access point (Access Point), a remote terminal (Remote Terminal), an access terminal (Access Terminal), a user terminal (User Terminal), a user agent (User Agent), a user device (User Device), or a user equipment (User Equipment).

The base station (for example, an access point) may refer to a device communicating with a wireless terminal via one or more sectors at an air interface in an access network. The base station may be configured to mutually convert a received over-the-air frame and an IP packet and serve as a router between the wireless terminal and the rest of the access network, where the rest of the access network may include an Internet Protocol (IP) network. The base station may also coordinate attribute management of the air interface. For example, the base station may be an evolved NodeB (NodeB or eNB or e-NodeB, evolved NodeB) in LTE.

The MME may be an MME in LTE.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The embodiments of the present invention mainly involve an SRVCC technology, and therefore, the technology is introduced first below briefly.

Key Points of the SRVCC Technology:

A terminal supports SRVCC, and an HSS (a server) subscribes to an SRVCC service for a user; a network side supports SRVCC; and an MME (a key control node, which is specified in a 3GPP protocol, of an LTE access network) has notified an eNodeB of a capability that both the terminal and the network side support SRVCC. Only in a situation in which the foregoing three points are met, can the eNodeB subsequently initiate an SRVCC process according to an actual situation.

When a UE (the terminal) supports SRVCC, and the UE makes a voice call by using VoLTE, the UE may notify a corresponding MME of an SRVCC capability of the UE when accessing a network, and the MME may request SRVCC subscription data of the UE from the HSS. When the MME determines that the UE supports SRVCC, the MME supports SRVCC, and that the HSS has the SRVCC subscription data of the UE, the NYSE may send an SRVCC Operation Possible (an information element specified in 3GPP and used to represent the SRVCC capability of the UE) information element to the eNodeB by using an Initial Context Setup Request (a message specified in 3GPP) message, as shown in FIG. 1. On the contrary, when the SRVCC capability is changed (supporting or not supporting) because any condition is changed, the MME needs to instruct the eNodeB to update the SRVCC Operation Possible saved on the eNodeB.

It is specified in the 3GPP protocol that, a signaling message that can carry the SRVCC Operation Possible information element only includes the Initial Context Setup Request (a message specified in 3GPP) and a handover request (handover request, a message specified in 3GPP). Further, the Initial Context Setup Request occurs only in processes of Attach (attach), Service Request (service request), and TAU (tracking area update) for which radio bearer resources need to be recovered, that is, when the user accesses a network or the user is changed from ECM-IDLE (an idle state) to ECM-CONNECTED (a connected state).

For example, the following introduces processing solutions, in which SRVCC needs to be involved, in two types of the prior art:

Prior Art 1

A UE that supports SRVCC keeps in an ECM-CONNECTED state, and an MME has delivered an SRVCC Operation Possible information element to an eNodeB, where the SRVCC Operation Possible information element may represent that the UE has an SRVCC capability or does not have an SRVCC capability.

Then, the SRVCC capability of the UE may be changed. A first situation is shown in 2a of FIG. 1. Because of an operation such as network transformation or maintenance, an SRVCC capability of the MME is changed, which mainly includes changing from originally not supporting SRVCC to supporting SRVCC, or changing from originally supporting SRVCC to not supporting SRVCC. A second situation is shown in 2b to 4b of FIG. 1. Because a subscribed service of the UE is changed, a modification operation needs to be performed, on an HSS, on SRVCC subscription data of a user, including adding the SRVCC subscription data for the user or deleting the SRVCC subscription data of the user; the HSS may notify the MME of updated SRVCC subscription data by using Insert Subscriber Data (a message specified in 3GPP) message; and after receiving the Insert Subscriber Data message, the MME may respond to the HSS by using an Insert Subscriber Data Ack (a response message specified in 3GPP) message.

In both of the foregoing two situations, the SRVCC capability of the UE is changed. The MME may determine whether the SRVCC capability of the UE is consistent with the SRVCC capability that has been previously delivered by the MME to the eNodeB, if the two capabilities are consistent, the MME does not need to instruct the eNodeB to update the SRVCC capability, and if the two capabilities are inconsistent, the MME needs to notify the eNodeB to update the SRVCC capability. However, because the user keeps in the ECM-CONNECTED state at this time, the MME cannot notify the eNodeB.

A problem in the prior art lies in that, when the UE is in the ECM-CONNECTED state, among S1-MME (an interface message between a base station and the MME) interface messages specified in 3GPP, no interface message can enable the MME to dynamically notify the eNodeB of information about the SRVCC operation change.

Prior Art 2

Figure 2:
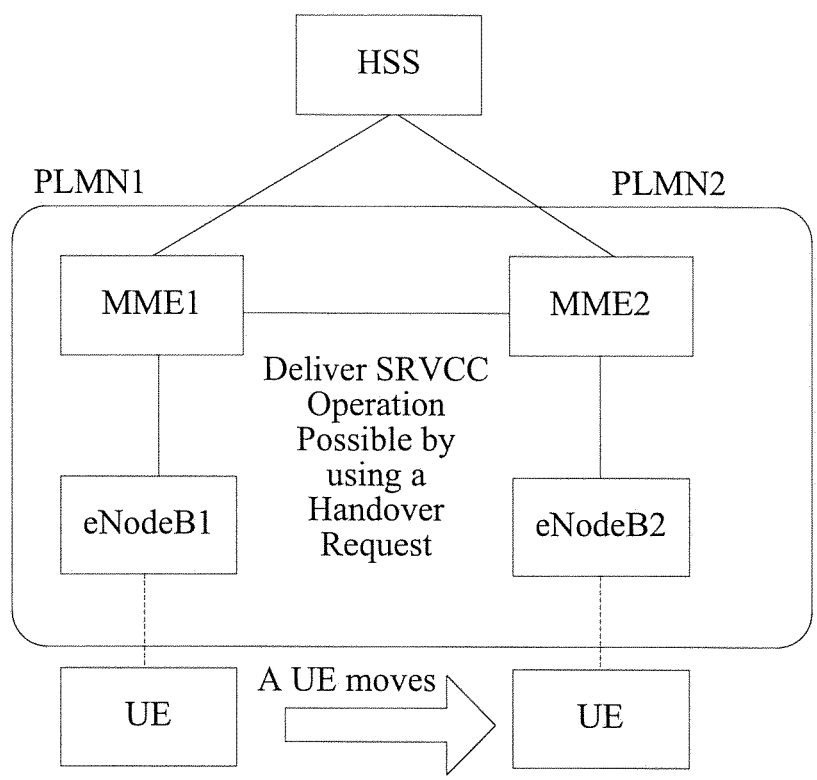
FIG. 2 is an overall schematic diagram of a situation about a change of an SRVCC capability of a terminal and about the notifying to a base station when the terminal is handed over between networks in the prior art.
Figure 3:
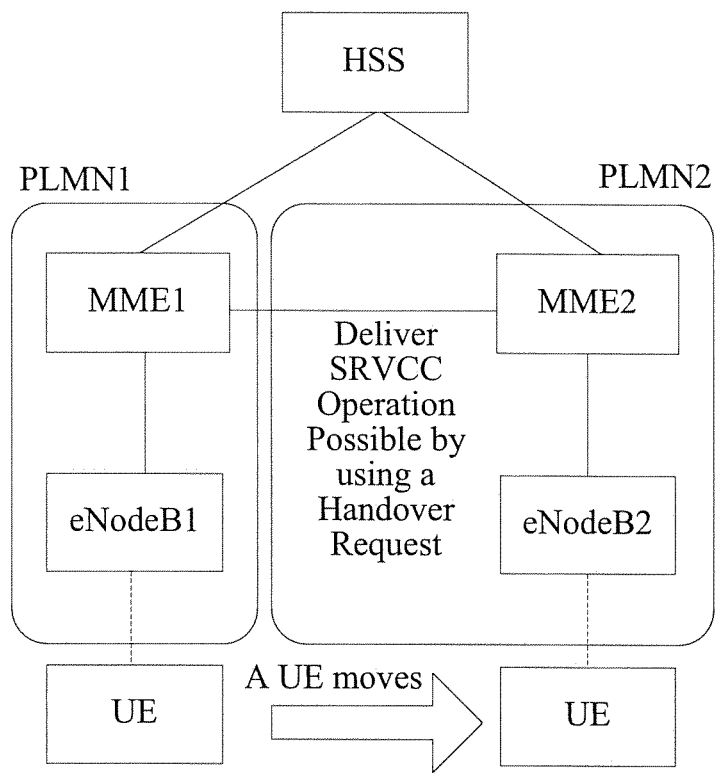
FIG. 3 is a schematic diagram of a situation about a change of an SRVCC capability of a terminal and about the notifying to a base station when the terminal is handed over between networks in the prior art.

When a UE supports SRVCC, and the UE is in an ECM-CONNECTED state (for example, a user is performing a data transmission service), the user is handed over from one network (a PLMN1) to another network (a PLMN2), where the PLMN indicates a public land mobile network (Public Land Mobile Network). At this time, a PS handover process occurs, and it is specified in a protocol that a destination side MME sends an SRVCC Operation Possible information element to a target eNodeB by using a Handover Request (handover request) message. As shown in FIG. 2, the target eNodeB is an eNodeB2 in FIG. 2. It can be seen from FIG. 2 that the handover process may be followed by a TAU process, a new MME, that is, an MME2 in FIG. 2, may update location information to an HSS, and the HSS may also deliver subscription data of the UE to the MME2 by using a location update process. Therefore, the MME2 should deliver the SRVCC Operation Possible information element to the eNodeB2 by using a Handover Request. The HSS in FIG. 2 supports the UE in subscribing to an SRVCC service. Therefore, two situations exist:

1. As shown in FIG. 3, a UE in FIG. 3 subscribes to an SRVCC function in a PLMN1, but the UE does not subscribe to the SRVCC function in a PLMN2, and both an MME1 and an MME2 support SRVCC. The MME1 and the MME2 belong to different PLMNs, that is, when a user is roamed and handed over from one network to another network, but a subscriber of an HSS can perform an SRVCC service only in the PLMN2, the MME2 acquires previous SRVCC subscription data and an SRVCC capability of the UE from the MME1 by using a Forward Relocation Request (a message specified in 3GPP) message. In addition, because the MME2 also supports SRVCC, the MME2 may deliver an SRVCC Operation Possible information element to an eNodeB by using a Handover Request message.

In a subsequent TAU process, the MME2 may initiate a location update process. In this case, because it is subscribed in the HSS that only the PLMN1 supports the SRVCC service and the PLMN2 does not support the SRVCC service, the HSS does not deliver a C-MSISDN and an STN-SR to the MME2. At this time, the MME2 should instruct the eNodeB to update the SRVCC Operation Possible information element to be not supporting SRVCC. However, because the UE is currently in a connected state, the MME2 cannot notify the eNodeB, and subsequently the eNodeB may still initiate an SRVCC process. In this case, the SRVCC process may be unsuccessful.

Figure 4:
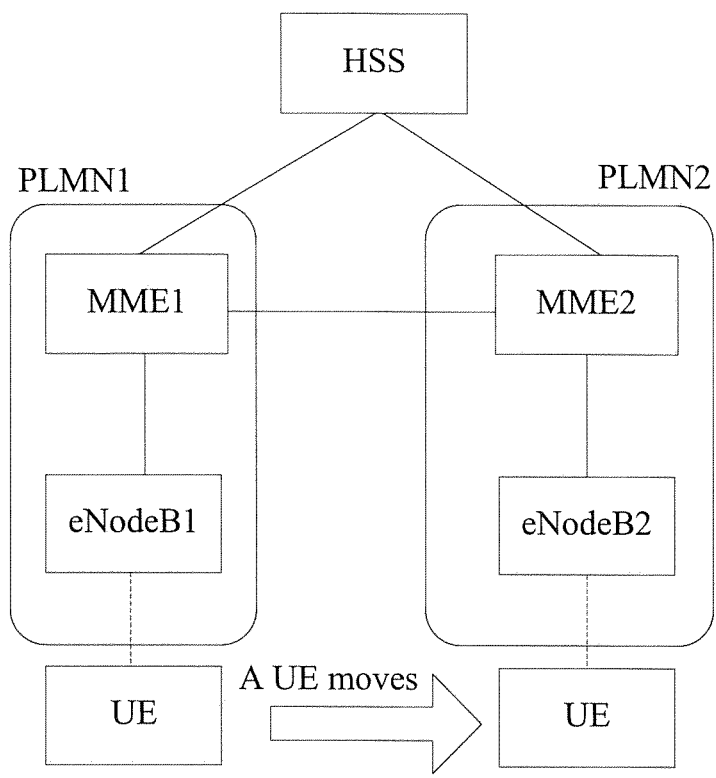
FIG. 4 is another schematic diagram of a situation about a change of an SRVCC capability of a terminal and about the notifying to a base station when the terminal is handed over between networks in the prior art.

2. As shown in FIG. 4, a UE in FIG. 4 does not subscribe to an SRVCC function in a PLMN1, but the UE subscribes to the SRVCC function in a PLMN2, and both an MME1 and an MME2 support SRVCC. The MME1 and the MME2 belong to different PLMNs, that is, when a user is roamed and handed over from one network to another network, but a subscriber of an HSS can perform an SRVCC service only in the PLMN2, the MME2 cannot obtain SRVCC subscription data of the UE at this time, and the MME2 can acquire only an SRVCC capability of the UE from the MME1 by using a Forward Relocation Request message, but cannot obtain the SRVCC subscription data of the UE. Although the MME2 also supports SRVCC, the MME2 does not deliver an SRVCC Operation Possible information element to an eNodeB by using a Handover Request message.

However, in a subsequent TAU process, the MME2 may initiate a location update process. Because it is subscribed in the HSS that the PLMN2 supports the SRVCC service, the HSS may deliver the SRVCC subscription data of the UE to the MME2. At this time, the MME2 should instruct the eNodeB to update the SRVCC Operation Possible information element to be supporting SRVCC. However, because the UE is currently in a connected state, the MME2 cannot notify the eNodeB, and subsequently the eNodeB cannot initiate an SRVCC process, which may cause voice interruption and then may cause a phenomenon such as call drop during a call of the user.

The method in the embodiments of the present invention may be used to effectively solve the problems in the prior art.

The following further describes the embodiments of the present invention in detail with reference to the accompanying drawings of the specification.

Embodiment 1

Figure 5:
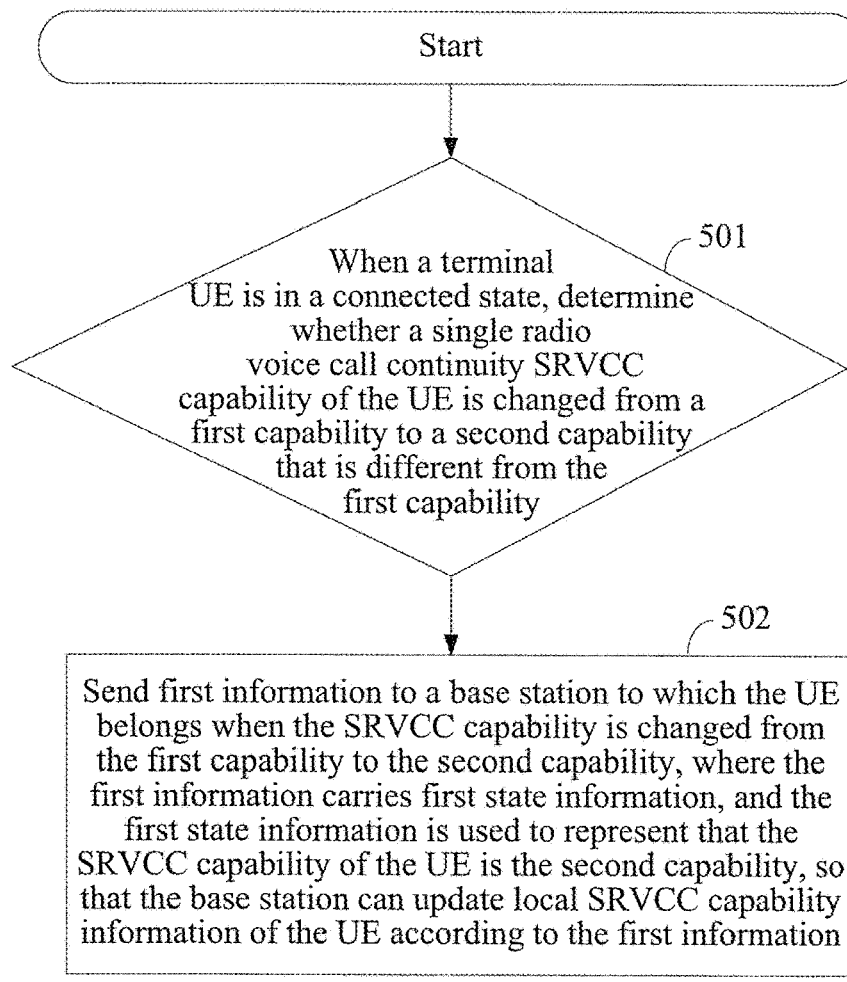
FIG. 5 is a main flowchart of an information transmission method according to an embodiment of the present invention.

Referring to FIG. 5, this embodiment of the present invention provides an information transmission method, where a main process of the method may be as follows:

Step 501: When a terminal UE is in a connected state, determine whether a single radio voice call continuity SRVCC capability of the UE is changed from a first capability to a second capability that is different from the first capability.

In this embodiment of the present invention, the method in Embodiment 1 may be applied to an MME.

In this embodiment of the present invention, the UE may have two states, that is, the connected state (ECM-Connected) and a non-connected state (ECM-IDLE).

When the UE is in the connected state, the UE may directly perform data transmission, and when the UE is in the non-connected state, the UE cannot perform data transmission.

In this embodiment of the present invention, in one situation, when the UE is in the connected state, a state that the UE supports SRVCC may be unchanged. For example, when the UE enters the connected state, if the UE supports SRVCC, the UE always supports SRVCC until the UE re-enters the non-connected state, or when the UE enters the connected state, if the UE does not support SRVCC, the UE always does not support SRVCC until the UE re-enters the non-connected state.

In this embodiment of the present invention, the SRVCC capability of the UE mainly covers three aspects: 1. whether the UE supports SRVCC; 2. whether SRVCC subscription data of the UE is available in an HSS (hereinafter referred to as a server) on a core network; and 3. whether an MME supports SRVCC.

In this embodiment of the present invention, the SRVCC capability of the UE may have two types, that is, a first capability and a second capability. The first capability may refer to a capability of supporting SRVCC, and the second capability may refer to a capability of not supporting SRVCC, or the first capability may refer to a capability of not supporting SRVCC, and the second capability may refer to a capability of supporting SRVCC.

That is, the SRVCC capability of the UE may be the first capability or the second capability.

Likewise, for the UE, the first aspect of the foregoing three aspects covered by the SRVCC capability may also be the first capability or the second capability. That is, the UE may support SRVCC or may not support SRVCC.

Likewise, for the MME itself, the third aspect of the foregoing three aspects covered by the SRVCC capability may also be the first capability or the second capability. That is, the MME itself may support SRVCC or may not support SRVCC.

When the UE is in the connected state, the MME may determine whether the SRVCC capability of the UE is changed, that is, whether the SRVCC capability of the UE is changed from the first capability to the second capability.

Preferably, in this embodiment of the present invention, assuming that the state that the UE supports SRVCC is not changed when the UE is in the connected state, only the second aspect and the third aspect of the SRVCC capability of the foregoing UE may be determined when the determining is performed.

Certainly, if the state that the UE supports SRVCC is changed when the UE is in the connected state, all the three aspects of the SRVCC capability of the foregoing UE may be determined when the determining is performed. All these embodiments fall within the protection scope of the present invention, and a person skilled in the art certainly knows how to perform an operation.

That is, when determining whether the SRVCC capability of the UE is changed, the MME may determine whether a capability that the MME itself supports SRVCC is changed from the first capability to the second capability, and may determine whether the SRVCC subscription data of the UE in the server is changed.

Specifically, the MME may first determine whether the capability that the MME itself supports SRVCC is changed from the first capability to the second capability, and then determine whether the SRVCC subscription data of the UE in the server is changed; or the MME may also first determine whether the SRVCC subscription data of the UE in the server is changed, and then determine whether the capability that the MME itself supports SRVCC is changed from the first capability to the second capability; or the two determining processes may also be performed at the same time.

Because of an operation such as network transformation or maintenance, a situation in which the MME supports SRVCC may be changed, which mainly includes changing from originally not supporting SRVCC to supporting SRVCC, or changing from originally supporting SRVCC to not supporting SRVCC.

Because a subscribed service of a user is changed, a modification operation may need to be performed, on the HSS, on the SRVCC subscription data (a C-MSISDN and an STN-SR) of the UE, including adding the SRVCC subscription data for the user or deleting the original SRVCC subscription data of the user, and the HSS may notify the MME of the updated SRVCC subscription data of the UE by using an Insert Subscriber Data (a process specified in 3GPP) process. Therefore, if the SRVCC subscription data is added for the UE, a situation in which the UE supports SRVCC may be changed from originally not supporting SRVCC to supporting SRVCC, and if the SRVCC subscription data is deleted for the UE, the situation in which the UE supports SRVCC may be changed from originally supporting SRVCC to not supporting SRVCC.

In this embodiment of the present invention, the SRVCC subscription data may at least include two pieces of data, that is, the C-MSISDN (Mobile Subscriber International Integrated Service Digital Network number, Correlation Mobile Subscriber International Integrated Service Digital Network number) and the STN-SR (Session Transfer Number for Single Radio Voice Call Continuity, Session Transfer Number for SRVCC).

In this embodiment of the present invention, the three aspects of the SRVCC capability of the UE are listed. As long as one aspect is changed, the SRVCC capability of the UE may change.

Because the UE in this embodiment of the present invention is in the connected state, it is unnecessary to determine the first aspect of the three aspects of the SRVCC capability.

Therefore, if the MME determines that the capability that the MME itself supports SRVCC is changed from the first capability to the second capability, it may be determined that the SRVCC capability of the UE is changed, that is, the first capability is changed to the second capability; or if the MME determines that the SRVCC subscription data of the UE in the server is changed, it may also be determined that the SRVCC capability of the UE is changed, that is, the first capability is changed to the second capability; or if the MME determines that the capability that the MME itself supports SRVCC is changed from the first capability to the second capability, and determines that the SRVCC subscription data of the UE in the server is changed, it may also be determined that the SRVCC capability of the UE is changed, that is, the first capability is changed to the second capability.

That is, in this embodiment of the present invention, if the two determining processes of determining whether the capability that the MME itself supports SRVCC is changed from the first capability to the second capability and determining whether the SRVCC subscription data of the UE in the server is changed are not performed at the same time, after the first determining process is performed, if it is determined that the capability that an object in the determining process supports SRVCC is changed, it may be directly determined, without performing a next determining process, that the SRVCC capability of the UE is changed from the first capability to the second capability.

Step 502: Send first information to a base station to which the UE belongs when the SRVCC capability is changed from the first capability to the second capability, where the first information carries first state information, and the first state information is used to represent that the SRVCC capability of the UE is the second capability, so that the base station can update local SRVCC capability information of the UE according to the first information.

In this embodiment of the present invention, the first information may be different information.

Situation 1: For example, the first information may be a message among S1-MME (between the base station and the MME) interface messages, where the first information may be information that can be sent by the MME to the base station when the UE is in the connected state. For example, the first information may be UE Context Modification Request (a message specified in 3GPP) information, or the first information may be other information, as long as the first information is information that can be sent by the MME to the base station when the UE is in the connected state, and the present invention is not limited thereto.

In this situation, the first information is the information that can be sent by the MME to the base station when the UE is in the connected state. Therefore, the MME can send the first information to the base station, thereby solving the technical problem in the prior art that when the UE in the connected state, the MME cannot send information to the base station to change the SRVCC capability of the UE.

In this embodiment of the present invention, the first state information may be carried in the first information, so as to send an SRVCC Operation Possible information element to the base station.

In this embodiment of the present invention, the first state information may be the SRVCC Operation Possible information element. The SRVCC Operation Possible information element may be used to represent the SRVCC capability of the UE. For example, the SRVCC Operation Possible information element may be used to represent whether the SRVCC capability of the UE is the first capability or the second capability.

For example, if the first information is the UE Context Modification Request information, specifically, information extension may be performed on the UE Context Modification Request information, so as to carry the SRVCC Operation Possible information element in an extension bit of the information. For example, the SRVCC Operation Possible information element may be carried in any location of the UE Context Modification Request information, that is, the information extension may be performed at any location of the UE Context Modification Request information.

In this embodiment of the present invention, the SRVCC capability information of the UE may be stored on the base station side, and the SRVCC capability information may be used to represent that the SRVCC capability of the UE is the first capability or the second capability.

In this way, after receiving the first information, the base station may update the local SRVCC capability of the UE according to the first state information in the first information.

Optionally, if the SRVCC capability information of the UE is stored on the base station side, the base station may compare the SRVCC capability carried in the first information with the locally stored SRVCC capability, and determine whether the two capabilities are consistent. If the two capabilities are consistent, the base station may perform no operation, and if the two capabilities are inconsistent, the base station may update the locally stored SRVCC capability information according to the SRVCC capability carried in the first information, so as to ensure that the SRVCC capability of the UE stored on the base station side can be updated in real time. In this way, it may be ensured that the base station can determine, according to correct information, whether to initiate an SRVCC process, continuity of voice communication may also be ensured as far as possible, and a situation such as call drop can be avoided as far as possible. Whether a determining result of the base station is that the SRVCC capability carried in the first information is consistent with the locally stored SRVCC capability or not, it may be considered that the base station updates the local SRVCC capability information according to the SRVCC capability carried in the first information.

For example, if the SRVCC capability carried in the first information is the first capability, and the SRVCC capability represented by the SRVCC capability information stored on the base station side is also the first capability, the base station may determine through comparison that the two capabilities are consistent, and the base station may perform no operation.

However, for example, if the SRVCC capability carried in the first information is the first capability, and the SRVCC capability represented by the SRVCC capability information stored on the base station side is the second capability, the base station may determine through comparison that the two capabilities are inconsistent, and the base station may update the locally stored SRVCC capability information according to the SRVCC capability carried in the first information. For example, the base station may update the SRVCC capability in the locally stored SRVCC capability information from the original second capability to the first capability.

Optionally, if the SRVCC capability information of the UE is not stored on the base station side, after acquiring the first information, the base station may directly store the first state information carried in the first information, that is, locally store the SRVCC capability of the UE in a form of the SRVCC capability information. Therefore, it may also be considered that the base station updates the local SRVCC capability information according to the SRVCC capability carried in the first information.

Situation 2: The first information may be information that is specified in a 3GPP protocol and can carry an SRVCC Operation Possible information element. For example, the first information may be Initial Context Setup Request (Initial Context Setup Request) information.

In this embodiment of the present invention, the first state information may be carried in the first information, so as to send the SRVCC Operation Possible information element to the base station.

In this embodiment of the present invention, the first state information may be the SRVCC Operation Possible information element. The SRVCC Operation Possible information element may be used to represent the SRVCC capability of the UE. For example, the SRVCC Operation Possible information element may be used to represent whether the SRVCC capability of the UE is the first capability or the second capability.

In this embodiment of the present invention, if the SRVCC capability information of the UE is stored on the base station side, the SRVCC capability information may be used to represent that the SRVCC capability of the UE is the first capability or the second capability.

In this way, after receiving the first information, the base station may compare the SRVCC capability carried in the first information with the locally stored SRVCC capability, and determine whether the two capabilities are consistent. If the two capabilities are consistent, the base station may perform no operation, and if the two capabilities are inconsistent, the base station may update the locally stored SRVCC capability information according to the SRVCC capability carried in the first information, so as to ensure that the SRVCC capability of the UE stored on the base station side can be updated in real time. In this way, it may be ensured that the base station can determine, according to correct information, whether to initiate an SRVCC process, continuity of voice communication may also be ensured as far as possible, and a situation such as call drop can be avoided as far as possible.

For example, if the SRVCC capability carried in the first information is the second capability, and the SRVCC capability represented by the SRVCC capability information stored on the base station side is also the second capability, the base station may determine through comparison that the two capabilities are consistent, and the base station may perform no operation.

However, for example, if the SRVCC capability carried in the first information is the second capability, and the SRVCC capability represented by the SRVCC capability information stored on the base station side is the first capability, the base station may determine through comparison that the two capabilities are inconsistent, and the base station may update the locally stored SRVCC capability information according to the SRVCC capability carried in the first information. For example, the base station may update the SRVCC capability in the locally stored SRVCC capability information from the original first capability to the second capability.

In this embodiment of the present invention, if the SRVCC capability information of the UE is not stored on the base station side, after acquiring the first information, the base station may directly store the first state information carried in the first information, that is, locally store the SRVCC capability of the UE in a form of the SRVCC capability information. Therefore, it may also be considered that the base station updates the local SRVCC capability information according to the SRVCC capability carried in the first information.

Preferably, in this embodiment of the present invention, in this situation, when the SRVCC capability of the UE is changed from the first capability to the second capability, before sending the first information to the base station, the MME may further first send second information to the base station, where the second information may be used to instruct the base station to switch a state of the UE from the connected state to the non-connected state.

Preferably, the second information may be, for example, UE Context Release Command (a message specified in 3GPP) information.

Preferably, in another embodiment of the present invention, that the MME sends the second information to the base station may be specifically that: the MME may first determine whether the UE is currently performing a first process flow, that is, determine whether the UE is currently performing some work.

If it is determined that the UE is not currently performing the first process flow, that is, the UE is currently processing no work, the MME may send the second information to the base station, and if it is determined that the UE is currently performing the first process flow, the MME may defer sending the second information, and may send the second information to the base station after the UE finishes processing the first process flow.

An objective of this operation is to ensure as far as possible that normal work of the UE is not affected.

Preferably, in another embodiment of the present invention, after sending the second information to the base station, the MME may maintain a bearer of the UE. In this embodiment of the present invention, the maintaining a bearer of the UE may mainly refer to maintaining a GBR (guaranteed bit rate) bearer of the UE to prevent the bearer from being released.

In this embodiment of the present invention, after sending the second information to the base station, the MME may obtain third information sent by the UE, where the third information may be used to request recovering the state of the UE, that is, may be used to request switching the state of the UE from the non-connected state to the connected state.

Preferably, the third information may be, for example, Service Request (a message specified in 3GPP) information.

In this embodiment of the present invention, the UE may actively send the third information to the MME, or the UE may be triggered to send the third information to the MME.

For example, if the UE is triggered to send the third information to the MME, a possible situation is that: if the UE is communicating with a network side before entering the non-connected state, when the UE enters the non-connected state, the network side may send a message to a PGW (Packet Data Network Gateway, packet data network gateway); after receiving the message, the PGW may send a message to an SGW (signaling gateway); after receiving the message, the SGW may send a message to the MME, for example, the message may be a Downlink Data Notification (a message specified in 3GPP) message; after receiving the message, the MME may trigger PAGING (a process specified in 3GPP) to the base station; subsequently, the base station may trigger PAGING to the UE, that is, send a paging message to the UE; and after receiving the paging message sent by the base station, the UE may send the third information to the MME.

After receiving the third information, the MME may send first request information to the base station, where the first request information may be used to request the base station to switch the state of the UE from the non-connected state to the connected state.

After receiving the first request information, the base station may switch the state of the UE from the non-connected state back to the connected state.

Then, when the base station switches the state of the UE from the non-connected state back to the connected state, the MME may send the first information to the base station, so as to send the SRVCC Operation Possible information element to the base station.

Embodiment 2

Figure 6:
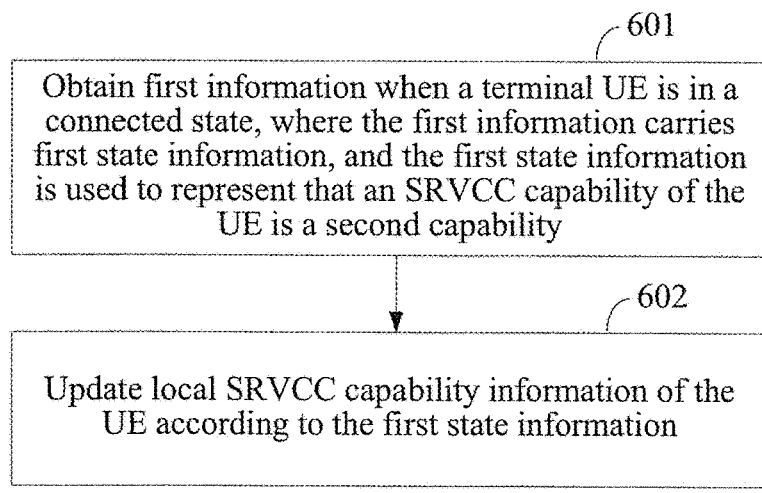
FIG. 6 is a main flowchart of an information modification method according to an embodiment of the present invention.

Referring to FIG. 6, this embodiment of the present invention provides an information modification method, where a main process of the method may be as follows:

Step 601: Obtain first information when a terminal UE is in a connected state, where the first information carries first state information, and the first state information is used to represent that an SRVCC capability of the UE is a second capability.

In this embodiment of the present invention, the information modification method in Embodiment 2 may be applied to a base station side, and the base station may be a base station to which the UE belongs.

When the UE is in the connected state, the MME may send the first information to the base station, so that the base station may obtain the first information, and the first information may carry the first state information.

In this embodiment of the present invention, the first state information may be, for example, an SRVCC Operation Possible information element, and the SRVCC Operation Possible information element may be used to represent the SRVCC capability of the UE. For example, the SRVCC Operation Possible information element may be used to represent that the SRVCC capability of the UE is the first capability or the second capability.

In this embodiment of the present invention, the first information may be different information.

Optionally, the first information may be information that can be sent by the MME to the base station when the UE is in the connected state. For example, the first information may be UE Context Modification Request information.

Optionally, the first information may be information that is specified in a 3GPP protocol and can carry the SRVCC Operation Possible information element. For example, the first information may be Initial Context Setup Request (Initial Context Setup Request) information.

In this embodiment of the present invention, if the first information is the information that is specified in the 3GPP protocol and can carry the SRVCC Operation Possible information element, when the terminal UE is in the connected state, before obtaining the first information, the base station may first obtain second information sent by the MME, where the second information may be used to represent switching a state of the UE. For example, the second information may be used to represent switching the state of the UE from the current connected state to the non-connected state. Then, after obtaining the second information, the base station may switch the state of the UE from the connected state to the non-connected state according to the second information.

In this embodiment of the present invention, after switching the state of the UE from the connected state to the non-connected state according to the second information, the base station may obtain first request information sent by the MME and used to represent switching the state of the UE. For example, the first request information may be used to represent switching the current state of the UE from the non-connected state to the connected state. Then, after obtaining the first request information, the base station may switch the state of the UE from the non-connected state to the connected state according to the first request information.

Step 602: Update local SRVCC capability information of the UE according to the first state information.

In this embodiment of the present invention, after obtaining the first information, the base station may update the local SRVCC capability information according to the first state information carried in the first information.

After receiving the first information, the base station may update the local SRVCC capability information of the UE according to the first state information in the first information.

Optionally, if the first information is the information that can be sent by the MME to the base station when the UE is in the connected state, for example, the first information is the UE Context Modification Request information, before receiving the first information, the base station side may store the SRVCC capability information of the UE in advance.

In this case, the base station may compare the SRVCC capability carried in the first information with a locally stored SRVCC capability, and determine whether the two capabilities are consistent. If the two capabilities are consistent, the base station may perform no operation, and if the two capabilities are inconsistent, the base station may update the locally stored SRVCC capability information according to the SRVCC capability carried in the first information, so as to ensure that the SRVCC capability of the UE stored on the base station side can be updated in real time. In this way, it may be ensured that the base station can determine, according to correct information, whether to initiate an SRVCC process, continuity of voice communication may also be ensured as far as possible, and a situation such as call drop can be avoided as far as possible.

Whether a determining result of the base station is that the SRVCC capability carried in the first information is consistent with the locally stored SRVCC capability or not, it may be considered that the base station updates the local SRVCC capability information according to the SRVCC capability carried in the first information.

For example, if the SRVCC capability carried in the first information is the first capability, and the SRVCC capability represented by the SRVCC capability information stored on the base station side is also the first capability, the base station may determine through comparison that the two capabilities are consistent, and the base station may perform no operation.

However, for example, if the SRVCC capability carried in the first information is the first capability, and the SRVCC capability represented by the SRVCC capability information stored on the base station side is the second capability, the base station may determine through comparison that the two capabilities are inconsistent, and the base station may update the locally stored SRVCC capability information according to the SRVCC capability carried in the first information. For example, the base station may update the SRVCC capability in the locally stored SRVCC capability information from the original second capability to the first capability.

Optionally, if the first information is the information that is specified in the 3GPP protocol and can carry the SRVCC Operation Possible information element, for example, the first information may be the Initial Context Setup Request (Initial Context Setup Request) information, before receiving the first information, the base station side may store no SRVCC capability information of the UE.

In this case, after acquiring the first information, the base station may directly store the first state information carried in the first information, and may store the first state information as the local SRVCC capability information, that is, locally store the SRVCC capability of the UE in a form of the SRVCC capability information. Therefore, it may also be considered that the base station updates the local SRVCC capability information according to the SRVCC capability carried in the first information.

Embodiment 3

Figure 7:
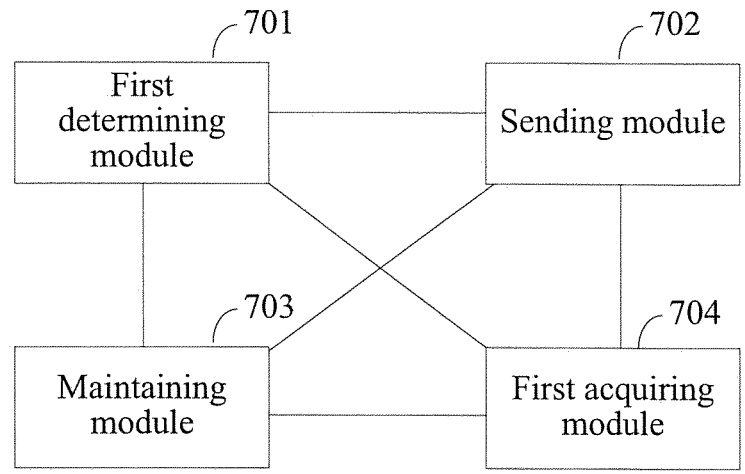
FIG. 7 is a detailed structural diagram of an information transmission apparatus according to an embodiment of the present invention.

Referring to FIG. 7, this embodiment of the present invention provides an information transmission apparatus, where the apparatus may include a first determining module 701 and a sending module 702. Preferably, the information transmission apparatus in this embodiment of the present invention may be located on the MME side.

Preferably, in this embodiment of the present invention, the apparatus may further include a maintaining module 703 and a first acquiring module 704.

The first determining module 701 may be configured to determine, when a terminal UE is in a connected state, whether a single radio voice call continuity SRVCC capability of the UE is changed from a first capability to a second capability that is different from the first capability.

In this embodiment of the present invention, the SRVCC capability of the UE mainly covers three aspects: 1. whether the UE supports SRVCC; 2. whether SRVCC subscription data of the UE is available in an HSS on a core network; and 3. whether an MME supports SRVCC.

The first determining module 701 may be specifically configured to determine whether a capability that the UE supports SRVCC is changed from the first capability to the second capability, and determine whether SRVCC subscription data of the UE in a server is changed, where if the capability that the UE supports SRVCC is changed from the first capability to the second capability, and/or the SRVCC subscription data of the UE in the server is changed, determine that the SRVCC capability of the UE is changed from the first capability to the second capability.

When the UE is in the connected state, the MME may determine whether the SRVCC capability of the UE is changed, that is, changed from the first capability to the second capability.

As stated above, in this embodiment of the present invention, it may be assumed that when the UE is in the connected state, a situation in which the UE supports SRVCC may not be changed. That is, when the determining is performed, it is unnecessary to consider the first aspect in the foregoing three aspects covered by the SRVCC capability. Therefore, the other two aspects may be determined.

That is, when determining whether the SRVCC capability of the UE is changed, the first determining module 701 may determine whether a capability that the MME supports SRVCC is changed from the first capability to the second capability, and may determine whether the SRVCC subscription data of the UE in the server is changed.

Then, if the first determining module 701 determines that the capability that the MME supports SRVCC is changed from the first capability to the second capability, it may be determined that the SRVCC capability of the UE is changed, that is, the first capability is changed to the second capability; or if the first determining module 701 determines that the SRVCC subscription data of the UE in the server is changed, it may be determined that the SRVCC capability of the UE is changed, that is, the first capability is changed to the second capability; or if the first determining module 701 determines that the capability that the MME supports SRVCC is changed from the first capability to the second capability, and determines that the SRVCC subscription data of the UE in the server is changed, it may be determined that the SRVCC capability of the UE is changed, that is, the first capability is changed to the second capability.

The first determining module 701 may be further configured to determine whether the UE is currently performing a first process flow.

The sending module 702 may be configured to send first information to a base station to which the UE belongs when the SRVCC capability is changed from the first capability to the second capability, where the first information carries first state information, and the first state information is used to represent that the SRVCC capability of the UE is the second capability, so that the base station can update local SRVCC capability information of the UE according to the first information.

The sending module 702 may be further configured to send second information to the base station, where the second information is used to instruct the base station to switch a state of the UE from the connected state to a non-connected state.

In this embodiment of the present invention, the first information may be different information.

For example, the first information may be information that can be sent by the MME to the base station when the UE is in the connected state. For example, the first information may be UE Context Modification Request (a message specified in 3GPP) information.

For example, the first information may be information that is specified in a 3GPP protocol and can carry an SRVCC Operation Possible information element. For example, the first information may be Initial Context Setup Request (Initial Context Setup Request) information.

If the first information is the information that can be sent by the MME to the base station when the UE is in the connected state, when the SRVCC capability of the UE is changed from the first capability to the second capability, before sending the first information to the base station, the MME may further first send second information to the base station, where the second information may be used to instruct the base station to switch the state of the UE from the connected state to the non-connected state.

The sending module 702 may be specifically further configured to: when the UE is not currently performing the first process flow, send the second information to the base station.

The sending module 702 may be further configured to send first request information to the base station according to the third information, so that the base station switches the state of the UE from the non-connected state to the connected state.

In this embodiment of the present invention, if the sending module 702 sends the second information to the base station, after sending the second information to the base station, the MME may obtain third information sent by the UE, where the third information may be used to request recovering the state of the UE, that is, may be used to request switching the state of the UE from the non-connected state to the connected state.

After the MME receives the third information, the sending module 702 may send first request information to the base station, where the first request information may be used to request the base station to switch the state of the UE from the non-connected state to the connected state.

The maintaining module 703 may be configured to maintain a bearer of the UE.

In this embodiment of the present invention, if the sending module 702 sends the second information to the base station, after the sending module 702 sends the second information, the maintaining module 703 may maintain the bearer of the UE.

In this embodiment of the present invention, the maintaining a bearer of the UE may mainly refer to maintaining a GBR bearer of the UE to prevent the bearer from being released.

The first acquiring module 704 may be configured to obtain the third information sent by the UE, where the third information is used to request recovering the state of the UE to the connected state.

Embodiment 4

Figure 8:
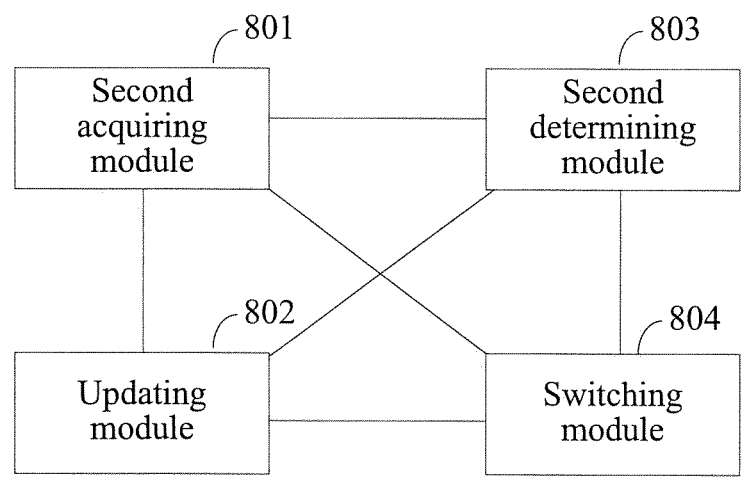
FIG. 8 is a detailed structural diagram of an information modification apparatus according to an embodiment of the present invention.

Referring to FIG. 8, this embodiment of the present invention provides an information modification apparatus, where the apparatus may include a second acquiring module 801 and an updating module 802. Preferably, the information modification apparatus in this embodiment of the present invention may be located on the base station side, and the base station may be a base station to which the UE belongs.

Preferably, the apparatus may further include a second determining module 803 and a switching module 804.

The second acquiring module 801 may be configured to obtain first information when the UE is in a connected state, where the first information carries first state information, and the first state information is used to represent that an SRVCC capability of the UE is a second capability.

When the UE is in the connected state, the MME may send the first information to the base station, so that the second acquiring module 801 may obtain the first information, and the first information may carry the first state information.

In this embodiment of the present invention, the first state information may be, for example, an SRVCC Operation Possible information element, and the SRVCC Operation Possible information element may be used to represent the SRVCC capability of the UE. For example, the SRVCC Operation Possible information element may be used to represent that the SRVCC capability of the UE is the first capability or the second capability.

In this embodiment of the present invention, the first information may be different information.

Optionally, the first information may be information that can be sent by the MME to the base station when the UE is in the connected state. For example, the first information may be UE Context Modification Request information.

Optionally, the first information may be information that is specified in a 3GPP protocol and can carry the SRVCC Operation Possible information element. For example, the first information may be Initial Context Setup Request (Initial Context Setup Request) information.

The second acquiring module 801 may be further configured to obtain second information that is used to represent switching a state of the UE.

In this embodiment of the present invention, if the first information is the information that is specified in the 3GPP protocol and can carry the SRVCC Operation Possible information element, when the terminal UE is in the connected state, before obtaining the first information, the base station may first obtain second information sent by the MME, where the second information may be used to represent switching a state of the UE. For example, the second information may be used to represent switching the state of the UE from the current connected state to the non-connected state. Then, after obtaining the second information, the base station may switch the state of the UE from the connected state to the non-connected state according to the second information.

The second acquiring module 801 may be further configured to obtain first request information that is used to represent switching the state of the UE.

In this embodiment of the present invention, after switching the state of the UE from the connected state to the non-connected state according to the second information, the base station may obtain first request information sent by the MME and used to represent switching the state of the UE. For example, the first request information may be used to represent switching the current state of the UE from the non-connected state to the connected state. Then, after obtaining the first request information, the base station may switch the state of the UE from the non-connected state to the connected state according to the first request information.

The updating module 802 may be configured to update local SRVCC capability information of the UE according to the first state information.

In this embodiment of the present invention, when the first information is the information that can be sent by the MME to the base station when the UE is in the connected state, for example, the first information is UE Context Modification Request information, the updating module 802 may be specifically configured to: when it is determined that the locally stored SRVCC capability information of the UE represents that the current SRVCC capability of the UE is a first capability that is different from the second capability, change the SRVCC capability corresponding to the locally stored SRVCC capability information of the UE to the second capability.

In this embodiment of the present invention, when the first information is the information that is specified in the 3GPP protocol and can carry the SRVCC Operation Possible information element, for example, the first information may be Initial Context Setup Request (Initial Context Setup Request) information, the updating module 802 may be specifically configured to store the first state information as the local SRVCC capability information.

The second determining module 803 may be configured to determine whether the locally stored SRVCC capability information of the UE represents that a current SRVCC capability of the UE is the second capability.

The switching module 804 may be configured to switch the state of the UE from the connected state to a non-connected state according to the second information.

The switching module 804 may be configured to switch the state of the UE from the non-connected state to the connected state according to the first request information.

Embodiment 5

Figure 9:
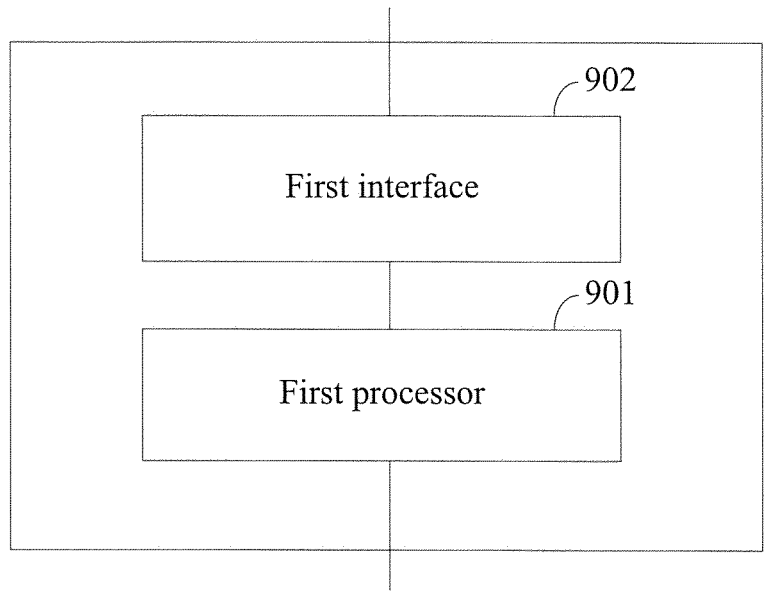
FIG. 9 is a schematic structural diagram of an information transmission apparatus according to an embodiment of the present invention.

Referring to FIG. 9, this embodiment of the present invention provides an information transmission apparatus, where the apparatus may include a first processor 901 and a first interface 902. Preferably, the information transmission apparatus in this embodiment of the present invention may be located on the MME side. Preferably, the information transmission apparatus in this embodiment of the present invention and the information transmission apparatus in Embodiment 3 may be a same apparatus.

The first interface 902 may be configured to interact with an external network element.

The first processor 901 may be configured to determine, when a UE is in a connected state, whether a single radio voice call continuity SRVCC capability of the UE is changed from a first capability to a second capability that is different from the first capability; and send first information to a base station to which the UE belongs through the first interface 902 when the SRVCC capability is changed from the first capability to the second capability, where the first information carries first state information, and the first state information is used to represent that the SRVCC capability of the UE is the second capability, so that the base station can update local SRVCC capability information of the UE according to the first information.

That the first processor 901 may be configured to determine, when a terminal UE is in a connected state, whether a single radio voice call continuity SRVCC capability of the UE is changed from the first capability to the second capability that is different from the first capability may specifically include that: the first processor 901 determines whether a capability that the UE supports SRVCC is changed from the first capability to the second capability, and determines whether SRVCC subscription data of the UE in a server is changed, where if the capability that the UE supports SRVCC is changed from the first capability to the second capability, and/or the SRVCC subscription data of the UE in the server is changed, determines that the SRVCC capability of the UE is changed from the first capability to the second capability.

In this embodiment of the present invention, when the SRVCC capability of the UE is changed from the first capability to the second capability, the first processor 901 may be further configured to send second information to the base station through the first interface 902, where the second information is used to instruct the base station to switch a state of the UE from the connected state to a non-connected state.

The first processor 901 may be further configured to determine whether the UE is currently performing a first process flow, and when the UE is not currently performing the first process flow, send the second information to the base station through the first interface 902.

The first processor 901 may be further configured to maintain a bearer of the UE.

The first processor 901 may be further configured to obtain, through the first interface 902, third information sent by the UE, where the third information is used to request recovering the state of the UE to the connected state, and may send first request information to the base station through the first interface 902 according to the third information, so that the base station switches the state of the UE from the non-connected state to the connected state.

The first determining module 701 and the maintaining module 703 in Embodiment 3 may be located in the first processor 901 in Embodiment 5, and the sending module 702 and the first acquiring module 704 in Embodiment 3 may be equivalent to the first interface 902 in Embodiment 5.

Embodiment 6

Figure 10:
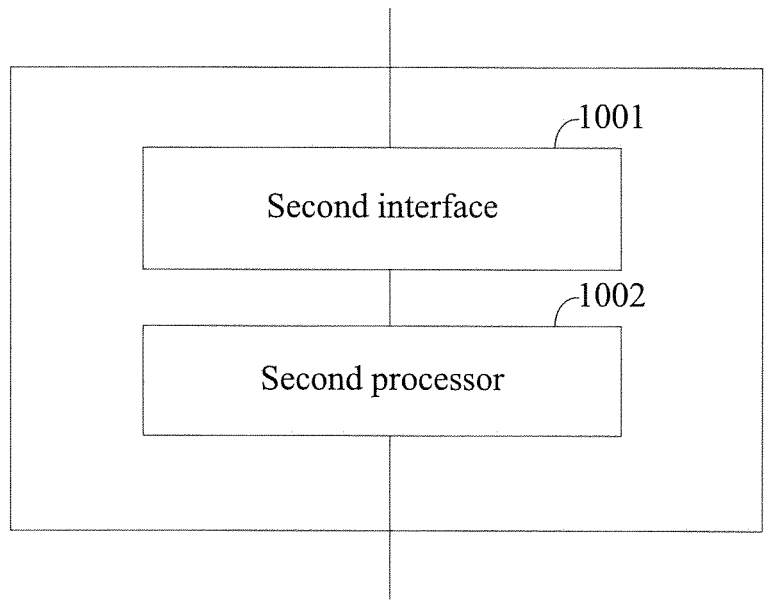
FIG. 10 is a schematic structural diagram of an information modification apparatus according to an embodiment of the present invention.

Referring to FIG. 10, this embodiment of the present invention provides an information modification apparatus, where the apparatus may include a second interface 1001 and a second processor 1002. Preferably, the information modification apparatus in this embodiment of the present invention may be located on a base station side, and the base station may be a base station to which the UE belongs. Preferably, the information modification apparatus in Embodiment 6 and the information modification apparatus in Embodiment 4 may be a same apparatus.

The second interface 1001 may be configured to interact with an external network element.

The second processor 1002 may be configured to: obtain first information through the second interface 1001 when the UE is in a connected state, where the first information carries first state information, and the first state information is used to represent that an SRVCC capability of the UE is a second capability; and may be configured to update local SRVCC capability information of the UE according to the first state information.

That the second processor 1002 may be configured to update local SRVCC capability information of the UE according to the first state information may specifically include that: the second processor 1002 may determine whether the locally stored SRVCC capability information of the UE represents that a current SRVCC capability of the UE is the second capability; and when it is determined that the locally stored SRVCC capability information of the UE represents that the current SRVCC capability of the UE is a first capability that is different from the second capability, change the SRVCC capability corresponding to the locally stored SRVCC capability information of the UE to the second capability.

In this embodiment of the present invention, when the first information is information that can be sent by the MME to the base station when the UE is in the connected state, for example, the first information is UE Context Modification Request information, the second processor 1002 may be specifically configured to determine whether the locally stored SRVCC capability information of the UE represents that the current SRVCC capability of the UE is the second capability; and when the locally stored SRVCC capability of the UE is the first capability that is different from the second capability, change the locally stored SRVCC capability of the UE to the second capability.

The second processor 1002 may be further configured to obtain, through the second interface 1001, second information that is used to represent switching a state of the UE, and switch the state of the UE from the connected state to a non-connected state according to the second information.

The second processor 1002 may be further configured to obtain, through the second interface 1001, first request information that is used to represent switching the state of the UE, and switch the state of the UE from the connected state to the non-connected state according to the first request information.

That the second processor 1002 may be configured to update local SRVCC capability information of the UE according to the first state information specifically includes: storing the first state information as the local SRVCC capability information.

In this embodiment of the present invention, when the first information is information that is specified in a 3GPP protocol and can carry an SRVCC Operation Possible information element, for example, the first information is Initial Context Setup Request (Initial Context Setup Request) information, the second processor 1002 may be specifically configured to store the first state information as the local SRVCC capability information.

The second acquiring module 801 in Embodiment 4 may be equivalent to the second interface 1001 in Embodiment 6, and the second determining module 803 and the updating module 802 in Embodiment 4 may be located in the second processor 1002 in Embodiment 6.

An information transmission method in the embodiments of the present invention may include: determining, when a terminal UE is in a connected state, whether a single radio voice call continuity SRVCC capability of the UE is changed from a first capability to a second capability that is different from the first capability; and sending first information to a base station to which the UE belongs when the SRVCC capability is changed from the first capability to the second capability, where the first information carries first state information, and the first state information is used to represent that the SRVCC capability of the UE is the second capability, so that the base station can update local SRVCC capability information of the UE according to the first information.

In the embodiments of the present invention, when the UE is in the connected state, if the SRVCC capability of the UE is changed, the first information may be used to notify the base station of the new SRVCC capability of the UE, so that the base station can update the locally stored SRVCC capability information of the UE according to the current SRVCC capability of the UE. In this way, when the UE is in the connected state, the base station may also be notified of a change situation of the SRVCC capability of the UE at any time, so that the base station may determine, according to an actual situation, whether to initiate an SRVCC process, so as to ensure as far as possible that the SRVCC process can be performed successfully, thereby improving a success rate of the SRVCC process, avoiding a phenomenon of call drop as far as possible, and ensuring continuity of voice communication. It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or some of the technical solutions may be implemented in the form of a software product. The software product is stored in a storage medium and includes several instructions for instructing a computer device (which may be a personal computer, a server, or a network device) or a processor (processor) to perform all or some of the steps of the methods described in the embodiments of the present application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely used to describe the technical solutions of the present application, and the description of the foregoing embodiments is only intended to make the method and core idea of the present invention more comprehensible, and shall not be construed as a limitation to the present invention. Any variation or replacement readily figured out by a person skilled in the art within the technical scope disclosed in the present invention shall fall within the protection scope of the present invention.

What is claimed is:

1. An information transmission method performed by a mobility management entity (MME), the method comprising:
  sending to a base station a first message including a first single radio voice call continuity (SRVCC) Operation Possible corresponding to a terminal device in a first procedure, wherein the first procedure is a first attach procedure, a first service request procedure, a first tracking area update procedure, or a first handover procedure, and the first SRVCC Operation Possible indicates both the terminal device and the MME are SRVCC capable, wherein a SRVCC capability of the terminal device stored on the base station can be updated in real time;
  determining that a SRVCC capability of the terminal device or the MME changes from SRVCC capable to SRVCC incapable while the terminal device is in an ECM-CONNECTED state; and
  sending to the base station a second message including a second SRVCC Operation Possible corresponding to the terminal device without performing a second procedure while the terminal device is in the ECM-CONNECTED state, wherein the second SRVCC Operation Possible indicates the terminal device or the MME is SRVCC incapable, and the second procedure comprises a second attach procedure, a second service request procedure, a second tracking area update procedure, or a second handover procedure.

2. The method according to claim 1, wherein determining that the SRVCC capability of the terminal device changes from SRVCC capable to SRVCC incapable comprises:
  determining that subscription data of the terminal device indicates that the terminal device is SRVCC incapable.

3. The method according to claim 2, wherein the first message is an initial context setup request message or a handover request message.

4. The method according to claim 1, wherein determining that the SRVCC capability of the terminal device changes from SRVCC capable to SRVCC incapable comprises:
  determining that an indication from the terminal device indicates that the terminal device is SRVCC incapable.

5. The method according to claim 4, wherein the first message is an initial context setup request message or a handover request message.

6. An information transmission apparatus, comprising:
  a processor; and
  a non-transitory computer readable storage medium storing programming that, when executed by the processor, causes the apparatus to:
    send to a base station a first message including a first single radio voice call continuity (SRVCC) Operation Possible corresponding to a terminal device in a first procedure, wherein the first procedure is a first attach procedure, a first service request procedure, a first tracking area update procedure, or a first handover procedure, and the first SRVCC Operation Possible indicates both the terminal device and the apparatus are SRVCC capable, wherein a SRVCC capability of the terminal device stored on the base station can be updated in real time;
    determine that a SRVCC capability of the terminal device or the apparatus changes from SRVCC capable to SRVCC incapable while the terminal device is in an ECM-CONNECTED state; and
    send to the base station a second message including a second SRVCC Operation Possible corresponding to the terminal device without performing a second procedure while the terminal device is in the ECM-CONNECTED state, wherein the second SRVCC Operation Possible indicates the terminal device or the apparatus is SRVCC incapable, and the second procedure comprises a second attach procedure, a second service request procedure, a second tracking area update procedure, or a second handover procedure.

7. The apparatus according to claim 6, wherein to determine that the SRVCC capability of the terminal device changes from SRVCC capable to SRVCC incapable, the programming, when executed by the processor, causes the apparatus to:
determine that subscription data of the terminal device indicates that the terminal device is SRVCC incapable.

8. The apparatus according to claim 7, wherein the first message is an initial context setup request message or a handover request message.

9. The apparatus according to claim 6, wherein to determine that the SRVCC capability of the terminal device changes from SRVCC capable to SRVCC incapable, the programming, when executed by the processor, causes the apparatus to:
determine that an indication from the terminal device indicates that the terminal device is SRVCC incapable.

10. The apparatus according to claim 9, wherein the first message is an initial context setup request message or a handover request message.

11. An information transmission method performed by a base station, the method comprising:
receiving a first message including a first single radio voice call continuity (SRVCC) Operation Possible corresponding to a terminal device from a mobility management entity (MME) or another base station in a first procedure, wherein the first procedure is a first attach procedure, a first service request procedure, a first tracking area update procedure, or a first handover procedure, and the first SRVCC Operation Possible indicates both the terminal device and the MME are SRVCC capable, wherein a SRVCC capability of the terminal device stored on the base station can be updated in real time;
storing first information, wherein the first information indicates both the terminal device and the MME are SRVCC capable;
receiving a second message including a second SRVCC Operation Possible corresponding to the terminal device from the MME without performing a second procedure while the terminal device is in an ECM-CONNECTED state, wherein the second SRVCC Operation Possible indicates the terminal device or the MME is SRVCC incapable, and the second procedure comprises a second attach procedure, a second service request procedure, a second tracking area update procedure, or a second handover procedure; and
updating the first information to indicate the terminal device or the MME is SRVCC incapable.

12. The method according to claim 11, wherein the first message is an initial context setup request message or a handover request message.

13. A base station, comprising:
a processor; and
a non-transitory computer readable storage medium storing programming that, when executed by the processor, causes the base station to:
receive a first message including a first single radio voice call continuity (SRVCC) Operation Possible corresponding to a terminal device from a mobility management entity (MME) or another base station in a first procedure, wherein the first procedure is a first attach procedure, a first service request procedure, a first tracking area update procedure, or a first handover procedure, and the first SRVCC Operation Possible indicates both the terminal device and the MME are SRVCC capable, wherein a SRVCC capability of the terminal device stored on the base station can be updated in real time;
store first information, wherein the first information indicates both the terminal device and the MME are SRVCC capable;
receive a second message including a second SRVCC Operation Possible corresponding to the terminal device from the MME without performing a second procedure while the terminal device is in an ECM-CONNECTED state, wherein the second SRVCC Operation Possible indicates the terminal device or the MME is SRVCC incapable, and the second procedure comprises a second attach procedure, a second service request procedure, a second tracking area update procedure, or a second handover procedure; and
update the first information to indicate the terminal device or the MME is SRVCC incapable.

14. The base station according to claim 13, wherein the first message is an initial context setup request message or a handover request message.

* * * * *